March 13, 1951  A. WEISS  2,545,181
OUTBOARD SUPPORT FOR THE ARM OF A
RADIAL BORING MACHINE
Filed Jan. 24, 1946  2 Sheets-Sheet 1
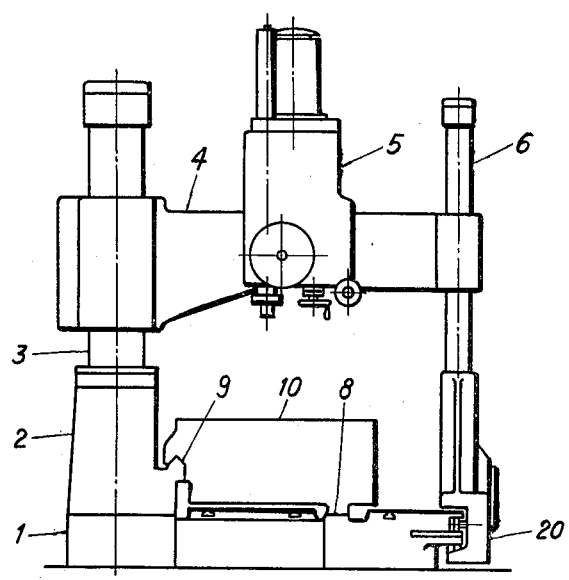
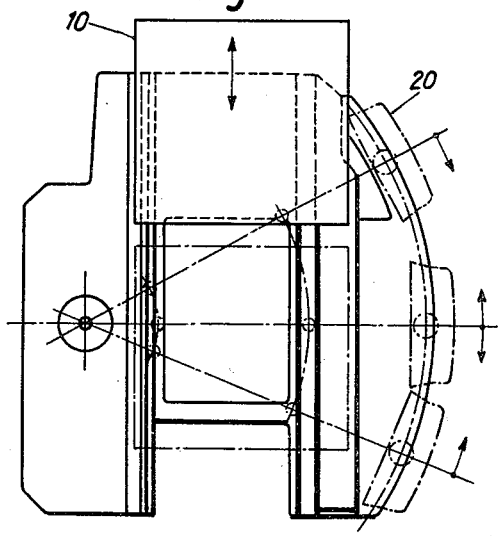
INVENTOR
ALBERT WEISS
BY
ATTORNEYS March 13, 1951
A. WEISS
2,545,181
OUTBOARD SUPPORT FOR THE ARM OF A
RADIAL BORING MACHINE
Filed Jan. 24, 1946
2 Sheets-Sheet 2
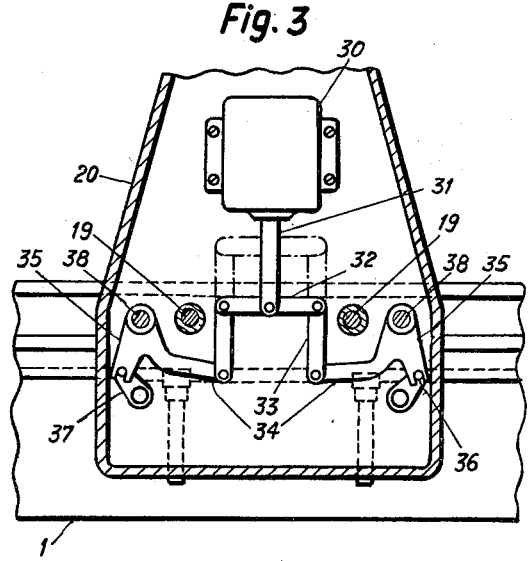
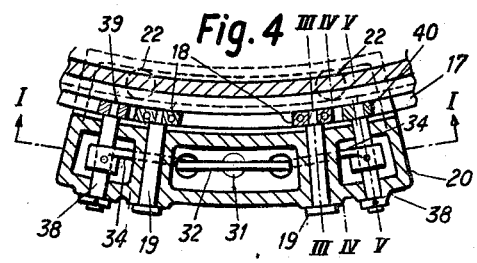
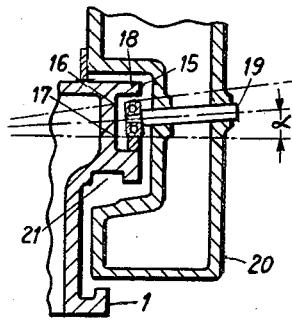
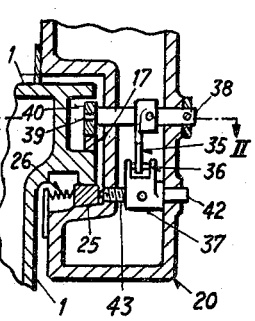
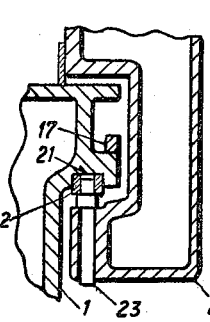
INVENTOR
ALBERT WEISS
BY
ATTORNEYS Patented Mar. 13, 1951

2,545,181

UNITED STATES PATENT OFFICE 2,545,181

OUTBOARD SUPPORT FOR THE ARM OF A RADIAL BORING MACHINE

Albert Weiss, Bassersdorf, Switzerland

Application January 24, 1946, Serial No. 643,170
In Switzerland February 2, 1945

9 Claims. (Cl. 77—28)

The present invention relates to the arrangement on the base plate of the work table for clamping work pieces and to the fixation of the arm support of radial boring machines. In the existing types of such boring machines a pedestal higher than the base plate is used for guiding the arm support. This arrangement has been adopted on the one hand in order to prevent damage to the slide-way of the arm supporting column, and on the other hand in order to shorten the supporting column itself for the purpose of making guiding more accurate. The space left between the pedestal and the pillar of the boring machine was mostly filled with a work table fitted with clamping grooves, the pieces to be machined being either put on the table or fixed to one of the front sides.

The pedestal raised above the bearing surface of the base plate involves the drawback of limiting the space on the base plate, with the result that both bulky and high work pieces cannot be handled on these machines. In place of the clamping work table loosely set on the base plate it will be more convenient to use a work table slidingly displaceable in guides tangentially to the pillar of the boring machine, thus making it possible—the arm being clamped—to drill holes to measure without marking out according to the coordinate system by displacing the drilling support on the one part, and the work table on the other part.

The object of the present invention is to evolve for the base plate and the work table as well as for the fixation of the support column a design suitable for enabling precision boring work to be carried out both on the work table and on bulky work pieces which have to be set on the base plate—without having to spend time on changes in setting-up.

The invention is characterised by the feature that the base plate has a bearing surface for the displaceable work table recessed in relation to the surface, and a front side running concentrically to the pillar of the boring machine and provided with guiding grooves running at an angle to one another, of which the one serves for guiding the support column vertically, and the other horizontally, and that for locking the support column on the base plate in one of the desired positions and subsequently releasing it the movement of at least one wedge-shaped bar and two clamping eccentrics actuated by an electromagnet is required.

The attached drawing shows a constructional example of realisation of the invention. On this drawing:

Fig. 1 is a view of the radial boring machine;

Fig. 2—a view from above of the same;

Fig. 3—the arm support column in section along the line I—I in Fig. 4;

Fig. 4—a section through the arm and the corresponding guiding part of the base plate, along line II—II in Fig. 6;

Fig. 5—a section through the arm and the corresponding guiding part of the base plate, along line III—III in Fig. 4;

Fig. 6—a section through the arm and the corresponding guiding part of the base plate, along line IV—IV in Fig. 4;

Fig. 7—a section through the arm and the corresponding guiding part of the base plate, along line V—V in Fig. 4.

On the base plate 1 is fitted the guide 2 for the column 3. On the column 3 is seated the arm 4 with the boring support 5. The arm is supported in known manner on the support column 6 which can be clamped on the base plate 1. The base plate includes a sliding face 8, and the column guide 2 a prismatic guide 9. The work table 10 is displaceable on these two guides. The slideway 8 is recessed in relation to the bearing surface of the base plate 1, so that the slideway cannot be damaged by work pieces set on it. A suitable arrangement is to control the displacement of the work table through a device not particularly described here by mechanical means or by hand; as shown in Fig. 2 the work table can be displaced to such an extent that the space on the base plate within action range of the boring spindle through the swinging arm is left free. Since the base plate does not present any raised area the whole of its surface can be used as bearing surface for the work pieces, with the exception of the recess for the guide 8. For bulky work pieces there is plenty of room available above this surface.

For work involving the drilling of holes according to the coordinate system without marking out or using drilling jigs the arm is adjusted at an angle to the table way and locked in position, and both the work table and the boring support 5 adjusted to measure. Owing to the recessed position of the guide of the support column 6 an absolutely accurate and reliable clamping of this column in fixed positions is an essential condition for precision boring work. These guiding and clamping mechanisms are shown in Figs. 4–7.

The base plate 1 is provided with a front side 15 arranged concentrically to the centre of the boring pillar, Fig. 5, and fitted with the groove 16. On the bottom horizontal face of this groove 16 is fixed a slide bar 17. On this slide bar 17 run the rollers 18 with tapering outer face, seated on the bolt 19. The bolts 19 form with the horizontal plane the angle $a$ and the angle of taper of the outer face of the rollers 18 corresponds to that angle. Since the bolts of the rollers 18 with tapering running faces stand at the acute angle $a$ to the horizontal plane, the slide bar 17 may have a square or rectangular section and consist of a bent hardened steel rod the bottom face and slide face of which can be ground plane parallel on a surface grinding machine, whilst the two bent faces may be left rough. This bar constitutes an absolutely smooth and hard sliding face for the rollers 18 and is not expensive to make. The rollers 18 support vertically the support base 20 of the support column 6. For the accurate guiding of the support base 20 in the horizontal sense a second groove 21 is arranged below the groove 16, which groove 21 is engaged by rollers or roller bearings 22, Fig. 7, seated on the bolt 23. The support base 20 is guided with accuracy by these four rollers. The guiding faces are well protected against dropping chips and boring oil, thus securing an absolutely reliable displacement of the support base 20 on the base plate 1. In order to clamp rigidly the arm support column 6 in the desired position on the base plate 1 a clamping device is used, actuated in known manner by an electromagnet 30. This clamping device differs from the types hitherto used in that, simultaneously with the clamping through the clamping jaws 40, to be described below, two wedge bars 25 standing under the pressure of springs 26 are shoved between the base plate 1 and the support base 20. A continuous wedge bar may also be used. Through the use of this clamping device the horizontal position of the swivelling arm 4 undergoes practically no modification when clamping the arm support column 6 with the base plate 1; this is due to the fact that, before the eccentric 39 is pressed against the running face 17, the wedge bars 25 are shoved between the guiding piece 20 and the base plate 1, and as a result a vertical displacement of the support base 20 only takes place to a very slight extent, only just sufficient to relieve the rollers 18 from the slide bar 17.

The clamping of the support base 20 is effected as follows: The two levers 34 are operated, over the connecting members 33, by the electromagnet 30, the armature of which is equipped with a connecting rod 31 to which is fixed the cross beam 32. The levers 34 are connected with fork levers 35 engaging the bolts 36 of the fork levers 37. The levers 34 and 35 are fixed on the bolts 38 which are each fitted with an eccentric pivot 39. The eccentric pivots 39 engage the clamping jaws 40 pressing on the guide bar 17 as soon as the armature of the magnet 30 is pulled upwards.

The shafts 42 on which are pinned the levers 37 are provided with a thread 43. The thread 43 of the two shafts 42 is left- and right-handed, and before the clamping through the eccentric bolts 39 and the clamping jaws 40 takes effect the springs 26 shove the clamping bars 25 between the base plate and the support base 20 of the arm support column 6. During the downward motion of the rod 31 the clamping through the eccentrics 39 is the first to be released, the clamping bars 25 being subsequently relieved against the pressure of the springs 26, so that the support base 20 is again resting freely on the roller bearings 18 and can be displaced.

I claim:

1. In a radial boring machine, the combination with the main column and the arm supporting column of said machine, of a base plate, a portion of the edge of the base plate extending concentrically to the main column and provided with guiding grooves running at an angle to each other, guide rollers mounted in the supporting column and running in said grooves, two of the rollers serving to guide the supporting column vertically and two for guiding the same horizontally, and means for compensating for the play necessary for the displacement between the guide of the supporting column and the base plate prior to the clamping of the supporting column to such plate, said means comprising at least one arcuate bar having a wedge-shaped cross-section.

2. An apparatus according to claim 1, wherein the arcuate bar is movable radially to the main column of the boring machine.

3. An apparatus according to claim 1, wherein the arcuate bar is movable radially to the main column of the boring machine, said apparatus including springs arranged to shift the arcuate bar in the radial direction into the clamping position prior to the clamping of the supporting column.

4. An apparatus according to claim 1, including threaded bolts arranged to release the clamping of the wedge-shaped bars.

5. An apparatus according to claim 1, including threaded bolts rotatable to displace the wedge-shaped bars out of clamping position, levers connected with the threaded portions, a magnet, a rod actuated by the magnet, and connected with the levers for rotating the bolts.

6. An apparatus according to claim 1, wherein the guide rollers which carry the supporting column are conical in form and are arranged at a sharp angle to the horizontal.

7. An apparatus according to claim 1, wherein the track for the guide rollers comprises a bent, hardened steel rod whose under surface and top guide surface are parallel to each other and are polished smooth.

8. In a radial boring machine, the combination with the main column and the arm-supporting column of said machine, of a base plate, the front edge of the base plate being concentric with the main column and provided with a horizontal track, anti-friction means mounted in said supporting column and normally running on said track, means for clamping the supporting column to said front edge of the base plate, a portion of the supporting column underlying the edge of the base plate, and a wedge-shaped member adapted to move into position between the supporting column and the said base plate edge to reduce the vertical displacement of the column on operation of the clamping means.

9. A radial boring machine as defined in claim 8, including a spring normally urging the wedge-shaped member into clamping position, means acting to hold said wedge-shaped member out of clamping position against the action of said spring, and mechanism operated through said clamping means for releasing said holding means to enable said wedge-shaped member to move into operative position under the action of the spring.

ALBERT WEISS.

REFERENCES CITED

The following references are of record in the file of this patent:

FOREIGN PATENTS

| Number | Country | Date |
| --- | --- | --- |
| 665,958 | Germany | Oct. 7, 1938 |

OTHER REFERENCES

Publication: "Machinery," page 795, July 1938, published by Industrial Press, 140–8 Lafayette Street, New York, N. Y.